Jan. 5, 1937.    J. R. THORP    2,066,589
DEFLECTOR SHIELD
Filed Dec. 23, 1935
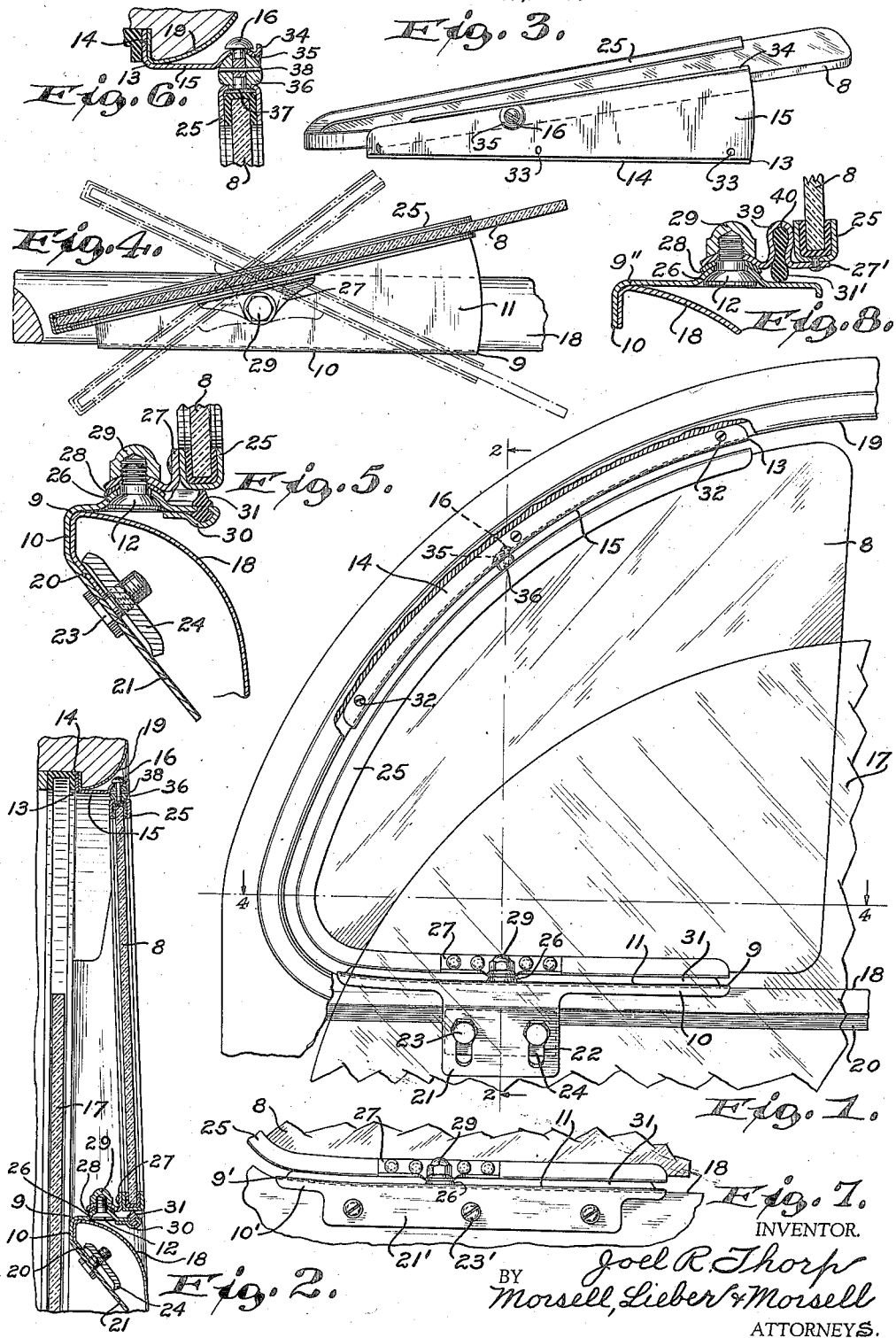
INVENTOR.
Joel R. Thorp
BY Morsell, Lieber & Morsell
ATTORNEYS.

Patented Jan. 5, 1937

2,066,589

UNITED STATES PATENT OFFICE 2,066,589

DEFLECTOR SHIELD

Joel R. Thorp, West Allis, Wis., assignor to The Fulton Company, West Allis, Wis., a corporation of Wisconsin Application December 23, 1935, Serial No. 55,776

5 Claims. (Cl. 296—84)

My present invention relates to improvements in the construction and operation of deflector shields or wings of the type which are cooperable with the side windows of automobile enclosures or the like, and which are pivotally adjustable relative to the main window openings in order to secure varied ventilation of the interior of the vehicle enclosure while avoiding undesirable draft.

An object of the present invention is to provide an improved deflector shield which is effectively cooperable with the relatively irregular side window openings of the more modern streamlined types of automobiles, and which can be conveniently applied as an accessory to the windows of such vehicles.

Another object of the invention is to provide an improved angularly adjustable window wing adapted to be positioned either in normal position with its outer face substantially flush with the outer surface of the vehicle enclosure, or forwardly inclined with its rear end disposed outwardly or away from the enclosure, or rearwardly inclined with its front end swung outwardly from normal position; and having means for preventing undesirable ingress of rain, snow, sleet or dust when in normal and forwardly inclined position.

A further object of the invention is the provision of a new and useful side wing for vehicle enclosures, having improved formation and disposition of the pivotal supports for permitting angular adjustment of the wing, whereby the latter may be caused to cooperate most effectively with main window reveals having odd shapes.

Still another object of the invention is to provide a durable and attractive ventilating accessory which may be readily attached to or removed from the side window reveals of most standard automobiles, without marring the finish of the car, and also without obstructing the vision or the normal adjustment of the adjacent window.

An additional object of the invention is to provide a simple but highly efficient air deflecting shield of highly attractive appearance, which can be manufactured at moderate cost with the aid of punches and dies.

These and other objects and advantages of the present invention will be apparent from the following detailed description.

A clear conception of several embodiments of the present improvement, and of the mode of manufacturing, installing and operating deflector shields built in accordance with the invention, may be had by referring to the drawing accompanying and forming a part of this specification wherein like reference characters designate the same or similar parts in the various views.

Fig. 1 is an inside elevation of the upper front portion of one of the side doors of a modern automobile, showing one of the improved deflector shields attached thereto at the main window opening; the main window having been partially lowered and some of the door structure having been broken away;

Fig. 2 is a transverse vertical section through the assemblage of Fig. 1, taken along the line 2—2, and showing the deflector shield positioned with its front and rear ends equidistant from the plane of the main window;

Fig. 3 is a top view of the deflector shield alone;

Fig. 4 is a longitudinal horizontal section through the assemblage of Fig. 1 taken along the line 4—4, showing the deflector shield in neutral position in solid lines, and in various other positions of adjustment in dot-and-dash lines;

Fig. 5 is an enlarged fragmentary transverse vertical section through the lower pivotal supporting portion of the deflector shield of Figs. 1 and 2;

Fig. 6 is a similarly enlarged fragmentary transverse vertical section through the upper pivotal supporting portion of the deflector shield of Figs. 1 and 2;

Fig. 7 is a fragmentary inside elevation of an assemblage somewhat similar to that of Fig. 1, but showing a modified type of attachment for the lower shield supporting bracket; and Fig. 8 is an enlarged fragmentary transverse vertical section through the lower pivotal supporting portion of a deflector shield showing a modified type of sealing strip associated with the adjustable shield.

Although the invention has been shown herein as being applied to a deflector shield especially adapted for cooperation as an accessory, to the side window of a streamlined road vehicle, it is not the intent to unnecessarily restrict the scope by such specific embodiment, since some of the improved features may be advantageously applicable to other forms of side wings for other types of vehicles.

Referring to Figs. 1 to 6 inclusive of the drawing, the improved deflector shield shown therein, comprises in general, a transparent deflecting shield 8 of substantially triangular shape and ordinarily formed of glass; a lower bracket 9 formed of sheet metal and having a depending flange 10 and an outwardly extending flange 11 projecting beneath the lower edge of the shield 8; a lower substantially vertical pivot 12 connecting the lower portion of the shield 8 with the flange 11 and disposed between the planes of the shield 8 and of the depending flange 10; an upper bracket 13 also formed of sheet metal and having an upstanding flange 14 and an outwardly extending flange 15 projecting over the upper edge of the shield 8; and an upper substantially vertical pivot 16 connecting the upper portion of the shield 8 with the flange 15 and disposed substantially in the plane of the shield 8.

This deflector shield assemblage is especially adapted for attachment to and cooperation with a main window assemblage having a main vertically slidable window 17 and lower and upper relatively inclined reveal portions 18, 19 respectively. The window reveals are covered with sheet metal, and the lower reveal portion 18 is substantially horizontal and has a depending outwardly inclined flange 20 spaced a slight distance from the external surface of the window 17 and normally concealed by the reveal portion 18. The lower bracket 9 is adapted to be positioned with its depending flange 10 in engagement with the inside surface of the reveal flange 20, and with its horizontal flange 11 projecting outwardly over the reveal portion 18; and the bracket 9 has an apron 21 formed integral with the medial portion of the flange 10 and coacting with the outwardly inclined lower part of the reveal flange 20, as clearly shown in Figs. 1, 2 and 5. The apron 21 has several slots 22 which are pierced by clamping screws 23 the threaded ends of which coact with a clamping plate 24 adapted to coact with the external surfaces of the apron 21 and of the reveal flange 20; and the plate 24 may be positioned as shown in Figs. 2 and 5, and subsequently fastened in clamping position by applying a thin wrench to the heads of the screws 23 when the window 17 has been lowered as far as possible.

The deflecting shield 8 has a trough shaped nosing strip 25 secured to the lower, front and upper edges thereof, this nosing substantially following the contour of the window reveal, and the shield 8 is slightly inclined so as to bring the outer face thereof substantially flush with the outer surface of the vehicle enclosure when the shield is positioned with its front and rear portions substantially equidistant from the plane of the main window 17 as shown in Fig. 2. The medial portion of the lower bracket flange 11 is provided with an upwardly extending projection 26 having a convex upper spherical zone surface, and a supporting member 27 secured to the lower part of the strip 25 is provided with a concave socket adapted to fit over the projection 26 and coacting therewith through a friction washer 28, see Figs. 2 and 5. The lower pivot 12 penetrates the projection 26 and the socketed portion of the member 27 with slight lateral clearance, and a clamping cap 29 coacts with the threaded upper end of the pivot 12 and with the member 27 to provide the friction necessary to retain the shield 8 in any desired position of angular adjustment. This pivot assembly obviously also provides for limited universal movement of the lower portion of the deflector shield 8 relative to its lower supporting bracket 9, thereby avoiding undesirable stress due to slight variations in shape of parts, or the like.

The outer edge 30 of the lower bracket flange 11 may be bent back beneath this flange as illustrated in Figs. 2 and 5, in order to reenforce the flange 11 and to provide a securing and receiving recess for a flexible seal 31. This seal 31 is of considerable length and is preferably formed of flexible material such as rubber or felt. The upper edge of the seal 31 is adapted to coact with the lowermost surface of the nosing strip 25 when the shield 8 is in neutral position as shown in solid lines in Fig. 4, and the shield may be swung in either direction from neutral position without obstruction by the seal 31, as clearly illustrated in dot-and-dash lines in Fig. 4.

The upper bracket 13 is capable of being positioned with its upstanding flange 14 in engagement with the inside surface of the upper reveal portion 19, and has its horizontal flange 15 extending outwardly beneath the portion 19 and over the top edge of the deflector shield 8. The upper bracket 13 may be attached to the reveal by screws 32 penetrating holes 33 formed either in the flange 14, or in the flange 15, or both, and the outer edge 34 of the flange 15 may be reenforced by vertical distortion, as shown, see Figs. 3 and 6. The medial outer edge portion of the upper bracket flange 15 is provided with a concavity 35 having a substantially spherical zone surface, and a ball member 36 secured to the upper portion of the nosing strip 25, has a spherical convex upper surface adapted to snugly fit the concavity 35. The ball member 36 may be rigidly and permanently attached to the upper part of the strip 25 by a pin 37 and solder, and may be detachably secured to the pivot 16 by means of a transverse locking pin 38. This pivot assembly obviously likewise provides for limited universal movement of the upper portion of the deflector shield 8 relative to its upper supporting bracket 13, thereby further avoiding undesirable stress in the deflector shield.

The modified deflector shield assembly of Fig. 7 is quite similar to that of Figs. 1 to 6 inclusive, except that the lower shield supporting bracket 9' is constructed slightly different. In this modification the bracket 9' has a depending flange 10', the medial portion of which is provided with an apron 21'. This apron coacts with the inner surface of the lower reveal 18 and is adapted to be attached thereto by means of screws 23'. This alternative attachment of the lower bracket may be used in cars having no depending lower reveal flange 20 of the form shown in Figs. 1 and 2.

While the sealing strip 31 of Figs. 1, 2 and 5 is secured to the stationary lower bracket 9 and is thus cooperable with the channel strip 25 of the shield 8 only when the latter is in neutral position, the seal may be secured to and movable with the shield, as shown in Fig. 8. In this modification, the lower sheet metal bracket 9'' is provided with a flat upper surface; and the supporting member 27' which is secured to and is movable with the shield 8, is provided with an integral bent portion 39 forming a recess 40 extending along the inner side of the lower horizontal portion of the nosing strip 25. The elongated flexible seal 31' which is snugly confined within the recess 40, coacts with the flat upper surface of the bracket 9'' during various angular adjustments of the shield 8; and also serves as a bumper for preventing damage to the upper edge of the main window 17 in case the latter is accidentally raised into contact with the seal 31' when the shield 8 has been swung into the plane of movement of the main window. Aside from the differences in construction of the bracket 9'', member 27' and seal 31', this modified assemblage may be the same as those previously described.

After the various parts of the improved ventilating wing or deflector shield have been properly constructed and initially assembled in the manner above described, the assemblage may be conveniently applied as an accessory to the reveal portions 18, 19 of most standard streamlined automobiles, by merely lowering the main window 17 as far as possible, and by attaching the lower and upper brackets 9, 13 as hereinabove described. The shield 8 may thereafter be angularly adjusted about the axes of the pivots 12, 16, so as to position the same either in neutral position as indicated in solid lines in Fig. 4, or with the forward end swung inwardly through the main window opening, or with the rear end of the shield 8 swung inwardly through the main window opening. When the shield of Fig. 5 is in neutral position, the flexible seal 31 engages the nosing strip 25, and the flanges 11, 15 will then function to prevent rain, sleet or snow from entering the gaps at the upper and lower ends of the deflector shield 8. With an assemblage such as shown in Fig. 8, the flexible seal 31' will coact with the flat upper surface of the bracket 9'' for various positions of adjustment of the shield 8, and will also protect the main window 17 against possible damage. When the shield 8 is positioned with its forward end swung outwardly away from the plane of the main window 17, it may be utilized to scoop air into the vehicle enclosure. Proper adjustment of the friction cap 29 will serve to maintain the shield 8 in any position of angular adjustment, and the shield 8 will not be subjected to undesirable stresses since the universal pivotal connections at the bottom and top thereof, combined with the nosing strip 25, will prevent such excessive stresses.

It will be noted that by locating the lower pivot 12 between the planes of the shield 8 and of the window 17, and by positioning the upper pivot 16 in the plane of the shield, the shield may be positioned so as to bring the outer face thereof substantially flush with the exterior of the vehicle enclosure when positioned as indicated in Fig. 2. This relative disposition of the pivots will also insure most effective swinging of the shield 8 during angular adjustment thereof, and co-operation of the shield edges with the window reveal at the forward portion of the window opening. The special disposition of the pivots will moreover permit considerable angular displacement of the deflector shield 8 without interfering with the sliding adjustment of the window 17, thereby permitting setting of the side wing so as to secure most efficient ventilation of the vehicle enclosure. The improved pivotal mountings for the deflector shield may also be conveniently produced by forming the brackets 9, 13, of sheet metal and in the manner described, and these brackets may obviously be readily secured to the reveals of a car.

From the foregoing detailed description it will be apparent that the present invention provides an improved deflector shield assemblage which can be manufactured and sold at moderate cost, and which can be readily and firmly attached to window reveal portions having odd shapes and disposed at a considerable angle relative to each other. Most of the parts of the improved assemblage can be readily manufactured from sheet metal with the aid of punches and dies, and the pivots may be readily constructed from rod stock. The improved structure may be conveniently applied to a window frame with the use of an ordinary screw driver and a sheet metal wrench, and the improved deflector shield is extremely durable in construction and presents a neat appearance when applied to a vehicle. This attachment may be effected without undesirably marring the finish of the vehicle, and the entire assemblage provides an effective ventilator especially for moving vehicles. The flexible seals also enhance the utility of the assemblage, and may be applied either to the fixed supporting brackets or to the movable shield.

It should be understood that it is not desired to limit the invention to the exact details of construction and to the precise mode of operation herein shown and described, for various modifications within the scope of the claims may occur to persons skilled in the art.

I claim:

1. In combination with a main window having an opening bounded by relatively inclined lower and upper reveal portions, a substantially triangular deflector shield disposed adjacent the plane of the main window and swingable through said opening, a bracket secured to the lower horizontal reveal portion and having an upwardly convex rounded surface located between the planes of said shield and of the main window directly above the lower horizontal reveal, a member carried by the lower portion of said shield and having a concavity engaging said surface, a pivot connecting said bracket and said member, a second bracket secured to the upper inclined reveal portion and having an upwardly extending rearwardly accessible concavity therein substantially in the plane of said shield, another member carried by the upper inclined portion of said shield and having a portion insertable forwardly into and engaging said bracket concavity, and another pivot connecting said second bracket and said other member, said pivots being substantially alined and constantly positioning said shield at an angle relative to the plane of the main window.

2. In combination with a main window having vertically spaced reveal portions, a deflector shield disposed adjacent the main window, brackets secured to said reveal portions and having flanges extending away from the main window and into close proximity to the upper and lower edges of said shield, a flexible seal carried by said shield and interposed between one of said flanges and the adjacent shield edge to form a sealed joint when said shield is angularly adjusted to different positions, and substantially alined pivots connecting said shield edges with the adjacent flanges.

3. In combination with a main window having lower and upper reveal portions, a deflector shield disposed adjacent the main window and having lower and upper edges spaced laterally from the lower and upper reveal portions respectively, a lower bracket secured to the lower reveal portion near the main window and having a flange provided with a flat surface extending beneath said lower shield edge, a pivot interposed between said shield and said flange and located between the planes of said shield and the main window, a flexible seal carried by said shield and cooperable with said flange surface when said shield is being angularly adjusted to different positions, an upper bracket secured to the upper reveal portion near the main window and having a flange extending over said upper shield edge, and another pivot interposed between said shield and said upper bracket flange and located in the plane of said shield.

4. In combination with a main window having upper and lower reveals, a deflector shield swingable through the main window opening, brackets secured to said reveals and having flanges extending above and below the upper and lower edges respectively of said shield, substantially alined pivots connecting said shield edges with the adjacent flanges, one of said pivots being disposed between the main window and said shield, and a flexible seal carried by said shield between the plane of the shield and the adjacent pivot and coacting with the adjacent bracket flange to provide a sealed joint for various positions of angular adjustment of said shield about said pivots.

5. In combination with a main window having upper and lower reveals, a deflector shield swingable through the main window opening, brackets secured to said reveals and having flanges extending above and below the upper and lower edges respectively of said shield, substantially alined pivots connecting said shield edges with the adjacent flanges, the upper of said pivots being disposed substantially in the plane of said shield and the lower of said pivots being located between the main window and the plane of said shield, and a flexible elongated seal carried by said shield between the plane of the shield and the lower pivot and coacting with the lower bracket flange to provide a sealed joint for various positions of angular adjustment of said shield about said pivots.

JOEL R. THORP.